United States Patent
Betella et al.

(10) Patent No.: US 12,106,330 B1
(45) Date of Patent: Oct. 1, 2024

(54) ADAPTIVE TEXT-TO-SPEECH SYNTHESIS FOR DYNAMIC ADVERTISING INSERTION IN PODCASTS AND BROADCASTS

(71) Applicants: Alberto Betella, Barcelona (ES); Benjamin Richardson, Boerne, TX (US)

(72) Inventors: Alberto Betella, Barcelona (ES); Benjamin Richardson, Boerne, TX (US)

(73) Assignees: Alberto Betella, Barcelona (ES); Benjamin Richardson, Boerne, TX (US)

( * ) Notice: Subject to any disclaimer, the term of this patent is extended or adjusted under 35 U.S.C. 154(b) by 0 days.

(21) Appl. No.: 17/524,730

(22) Filed: Nov. 11, 2021

Related U.S. Application Data (60) Provisional application No. 63/112,199, filed on Nov. 11, 2020.

(51) Int. Cl.
*G06Q 30/0251* (2023.01)
*G06F 16/635* (2019.01)

(52) U.S. Cl.
CPC ....... *G06Q 30/0271* (2013.01); *G06F 16/635* (2019.01); *G06Q 30/0252* (2013.01)

(58) Field of Classification Search
CPC ............ G06Q 30/0271; G06Q 30/0252; G06F 16/635
See application file for complete search history.

(56) References Cited

U.S. PATENT DOCUMENTS

| | | | |
|---|---|---|---|
| 10,902,841 B2 * | 1/2021 | Liu .................... | G10L 25/63 |
| 2002/0133349 A1 * | 9/2002 | Barile .................... | G11B 27/34 |
| | | | 704/265 |
| 2004/0039796 A1 * | 2/2004 | Watkins ................ | H04H 60/07 |
| | | | 709/218 |
| 2005/0144002 A1 * | 6/2005 | Ps .......................... | G10L 13/10 |
| | | | 704/266 |
| 2006/0122834 A1 * | 6/2006 | Bennett ............... | G10L 15/1822 |
| | | | 704/E15.047 |
| 2009/0204402 A1 * | 8/2009 | Marwaha ........... | G06Q 30/0273 |
| | | | 704/260 |

(Continued)

FOREIGN PATENT DOCUMENTS

| | | | | |
|---|---|---|---|---|
| KR | 102279772 B1 * | 1/2020 | ............ | G06T 19/00 |
| WO | WO-2020128134 A1 * | 6/2020 | ......... | G06K 9/00979 |

OTHER PUBLICATIONS

Binkowski et al., High Fidelity Speech Synthesis with Adversarial Networks, Sep. 26, 2019, arXiv, https://arxiv.org/abs/1909.11646, DOI: 10.48550/ARXIV.1909.11646 (Year: 2019).*

(Continued)

*Primary Examiner* — Dipen M Patel
(74) *Attorney, Agent, or Firm* — Ross D. Snyder (57) ABSTRACT

Method and system for generation of audio clip replicating the voice of a human speaker that may be dynamically inserted as an audio clip in digitally requested media files, such as podcasts, streams and broadcasts. Using a sample of speech from a previously-recorded audio file, a streaming audio source or a broadcast, a text-to-speech synthesis engine mimicking or cloning the voice present in the audio input is used to generate novel audio clip which is inserted in the requested media file.

20 Claims, 6 Drawing Sheets

(56) References Cited

U.S. PATENT DOCUMENTS

| | | | | |
|---|---|---|---|---|
| 2010/0036731 | A1* | 2/2010 | Vieri | G06Q 30/0273 |
| | | | | 705/14.69 |
| 2011/0231261 | A1* | 9/2011 | Sattaru | G06Q 30/02 |
| | | | | 705/14.66 |
| 2014/0258858 | A1* | 9/2014 | Hwang | G09B 5/062 |
| | | | | 715/716 |
| 2015/0046267 | A1* | 2/2015 | MacTiernan | H04L 12/18 |
| | | | | 705/14.66 |
| 2016/0092932 | A1* | 3/2016 | Bharath | G10L 13/00 |
| | | | | 705/14.67 |
| 2021/0217413 | A1* | 7/2021 | Tushinskiy | H04N 21/2668 |
| 2022/0027709 | A1* | 1/2022 | Honkala | G06T 5/002 |
| 2022/0187300 | A1* | 6/2022 | Rak | G01N 33/5748 |

OTHER PUBLICATIONS

Kim, C.-I.; Kim, M.; Jung, S.; Hwang, E. Simplified Fréchet Distance for Generative Adversarial Nets. Mar. 11, 2020, MDPI, https://doi.org/10.3390/s20061548 (Year: 2020).*

Hamed Alqahtani et al., Applications of Generative Adversarial Networks (GANs): An Updated Review, Dec. 19, 2019, Archives of Computational Methods in Engineering vol. 28, pp. 525-552 (2021), https://doi.org/10.1007/s11831-019-09388-y (Year: 2019).*

* cited by examiner

ADAPTIVE TEXT-TO-SPEECH SYNTHESIS FOR DYNAMIC ADVERTISING INSERTION IN PODCASTS AND BROADCASTS

CROSS REFERENCE TO RELATED APPLICATION

This application claims the benefit of U.S. provisional application No. 63/112,199, filed on Nov. 11, 2020 and titled Adaptive Text-to-speech Synthesis for Dynamic Advertising Insertion in Podcasts and Broadcasts.

FIELD OF DISCLOSURE

The present disclosure is generally related to systems and methods of contextual advertising.

BACKGROUND

The current state of advertisement in digital audio recordings and live streams that may be distributed via streaming or Really Simple Syndication (RSS) feeds, such as podcast episodes, or other digital distribution methods, exists in two forms: dynamically inserted advertisements and so-called native advertisements.

Native advertisements are pre-recorded messages within an audio recording made at the time of recording. Native advertisements are embedded in the original recording prior to its distribution and they are not designed for alteration.

Dynamically inserted advertisements are audio snippets of varying length that are placed within a pre-recorded audio or live stream on the fly prior to their distribution. Such advertisements can be automatically embedded anywhere in the audio streams in predetermined locations (pre-roll, mid-roll, end-roll) and in other suitable locations based on placeholders or audio features (e.g., in presence of silence or pauses).

Dynamically inserted advertisements can be replaced multiple times in the same audio content for each one of the listeners to maximize relevance based on location, device type, language and other environmental, demographic and socioeconomic characteristics.

Host-read advertisement snippets (i.e., snippets recorded by a human speaker) are a subset of both native advertising and dynamically inserted advertisements within audio media. Host-read advertisements can be created at the time of recording or inserted into an audio stream dynamically at the time of download or transmission.

In podcasts and radio shows, the amount of back catalogue episodes embedding native advertisements is significant, thus resulting in a decreased relevance over time. Because the removal of native advertisements can be cumbersome, dynamically inserted advertisements are today the preferred choice of content publishers.

However, due to the need to continuously update the dynamically inserted advertisements, these audio snippets are pre-recorded following a static script and using voice and message style which are typically incongruent with the original audio recording (i.e., they significantly differ from the voice and style of the show host).

Accordingly, there is a need for a solution in the market for the above-mentioned drawbacks.

SUMMARY

The current disclosure is a method and system for the ad-hoc generation of novel audio content from any textual input that may be dynamically inserted as advertisement within a pre-recorded audio file, a podcast and a live or a pre-recorded digital audio stream or broadcast.

The resulting advertisement is a digitally-generated audio snippet that replicates accurately the voice of the main speaker or speakers (hereinafter referred as "host" or "hosts") in the original audio source, or that reproduces some of the most salient prosodic features in their voice.

When an end-user device such as a laptop, a smartphone or a smart speaker requests the audio file via distribution methods such as RSS feeds or streaming, their request is redirected to a profiling module that extracts metadata and generates a profile of the end user that may include demographics and socioeconomic information.

The profile is then routed to an ad middleware module that identifies and returns the most optimal advertisement in textual form.

The text of the advertisement, that may contain placeholders for dynamic replacements based on the end-user profile, is sent to a text-to-speech (TTS) engine which, in turn, verifies the availability of an existing voice model for the requested audio source. In the case the voice model is not available, a voice model generator component is responsible for its creation.

The training dataset for the voice model generator is the voice of the host in the original audio source, along with its extracted matrix of spectrographic and prosodic features.

Voice models are generated by means of supervised and unsupervised machine learning and deep learning techniques, such as Generative Adversarial Networks (GAN).

Once a voice model is available, it is sent to the TTS engine along with the advertisements previously returned by the ads middleware. The TTS engine generates a new audio snippet containing the advertisement replicating or mimicking the host's voice and then queries the ad stitcher module that stitches the newly generated audio into the audio source at a predetermined or dynamically chosen position. The system then delivers the audio content including the dynamically inserted advertisement to the end-user client that originally requested it.

Host-read advertisement using the host's cloned voice or a voice that is similar to the host in terms of prosodic features, results in a higher trustworthiness and efficacy in the products and services advertised.

The current disclosure allows for a new programmatic approach in host-read advertisements through a novel method for the generation and dynamic insertion of host-read advertisements that makes them more scalable, customizable, and cost effective.

In accordance with the present disclosure, a system for adding an audio clip to a media file is disclosed. The system comprises one or more user devices associated with respective users and a server. The one or more user devices are configured to request the media file using a user interface. The server is in communication with the one or more user devices. The server comprises a request profiling module, an ads middleware module, a voice model generator, a text-to-speech engine, and an ad stitcher module.

The request profiling module is configured to receive a request of the media file from the user device and generate a profile of the associated user by extracting a plurality of information from the received request.

The ads middleware module is communicatively coupled with the request profiling module, and an in-house ads inventory or one or more third-party ads providers. The ads middleware module is configured to retrieve the extracted information of the user and determine a text from any one of the in-house ads inventory, and the one or more third-party ads providers for generating the audio clip based on the extracted information, the in-house ads inventory being configured to store one or more text-data corresponding to one or more audios.

The voice model generator module is communicatively coupled to an audio database, e.g., including an audio dataset or Voice Dataset. The voice model generator is configured to analyze the audio dataset to generate one or more voice models to clone and mimic one or more voices included in the audio dataset. The audio dataset is generated by extracting features of one or more previously requested media files. The one or more voice models are stored in a voice model database.

The text-to-speech (TTS) engine is configured to be in communication with the voice model database and the ads middleware module. The TTS engine is configured to retrieve the text from the ads middleware module and convert the text into an audio clip using one or more voice models stored in the voice model database.

The ad stitcher module is coupled with the TTS engine. The ad stitcher module is configured to insert the generated audio clip into the requested media file to generate an integrated media file.

The present disclosure further discloses a method for adding an audio clip to a media file, the method comprising: receiving, by a server, a request for the media file from a user device associated with a user; generating, by a request profiling module of the server, a profile of the user by extracting a plurality of information from the received request; retrieving, by an ads middleware module, the profile of the user from the request profiling module; establishing, by the ads middleware module of the server, communication with an in-house ads inventory and one or more third-party ads providers; determining, by the ads middleware module, availability of a corresponding text from any one of the in-house ads inventory and the one or more third-party ads providers based on the retrieved information; associating, by a voice model generator module of the server, a voice model of an audio dataset, e.g., Voice Dataset, the audio dataset being generated by extracting one or more features of one or more previously requested media files, the one or more voice models being stored in a voice model database; retrieving, by a text-to-speech (TTS) engine of the server, the available text from the ads middleware module; generating, by the TTS engine, the audio clip associated with the available text using a corresponding voice model from the one or more voice models stored in the voice model database; retrieving, by an ad stitcher module of the server, the generated audio clip from the TTS engine; and inserting, by the ad stitcher module, the retrieved audio clip into the requested media file to generate an integrated media file. In some embodiments, the generated audio clip is intended to mimic or "clone" an individual voice, e.g., that of a radio personality or podcast host for embedded local marketing in a widely-syndicated program. Thus, a virtual audio clone may be used as a stand-in for voice talent that would otherwise have to be present more often or in more diverse locations than is practical.

One aspect of the invention features, in some embodiments, a system for adding a cloned audio clip to a media file. The system includes one or more user devices associated with respective users, the one or more user devices being configured to request the media file using a user interface, and a server in communication with the one or more user devices. The server includes a request profiling module configured to receive a request of the media-file from the user device and generate a profile of the associated user by extracting a plurality of information from the received request; an ads middleware module communicatively coupled with the request profiling module, an in-house ads inventory, and one or more third-party ads providers, the ads middleware module configured to retrieve the extracted information of the user and determine a text from any one of the in-house ads inventory, and the one or more third-party ads providers for generating the audio clip based on the extracted information, the in-house ads inventory being configured to store one or more text-data; a voice model generator module communicatively coupled to an audio dataset, the voice model generator configured to analyze the audio dataset to generate one or more voice models to clone and mimic one or more voices included in the audio dataset, the audio dataset being generated by extracting features of one or more previously requested media files, the one or more voice models being stored in a voice model database; a text-to-speech (TTS) engine configured to be in communication with the voice model database and the ads middleware module, the TTS engine configured to retrieve the text from the ads middleware module and convert the text into an audio clip using one or more voice models stored in the voice model database; and an ad stitcher module coupled with the TTS engine, the ad stitcher module configured to insert the generated audio clip into the requested media file to generate an integrated media file.

In some embodiments, the text comprises one or more placeholders to change a part of the text as per the generated profile of the user.

In some embodiments the generated profile of the user comprises one or more of IP address, time, method, and resource, geolocation, local time based on the geolocation, type of the user device, demographics, socioeconomic and environmental characteristics, language, and local weather.

In some embodiments, the voice model generator module is configured to extract prosodic and spectrographic audio features of the one or more previously requested media files stored in the audio dataset.

In some embodiments, the voice model generator module uses Generative Adversarial Networks (GAN) and Fréchet Audio Distance to create the voice model to clone and mimic one or more voices included in the audio dataset.

Another aspect of the invention features, in some embodiments, a method for adding an audio clip to a media file. The method includes receiving, by a server, a request for the media file from a user device associated with a user; generating, by a request profiling module of the server, a profile of the user by extracting a plurality of information from the received request; retrieving, by an ads middleware module, the profile of the user from the request profiling module; establishing, by the ads middleware module of the server, communication with an in-house ads inventory and one or more third-party ads provider; and determining, by the ads middleware module, availability of a corresponding text from any one of the in-house ads inventory and the one or more third-party ads providers based on the retrieved information. The method further includes associating, by a voice model generator module of the server, a voice model of an audio dataset, the audio dataset being generated by extracting one or more features of one or more previously requested media files, the one or more voice models being stored in a voice model database; retrieving, by a text-to-speech (TTS) engine of the server, the available text from the ads middleware module; generating, by the TTS engine, the audio clip associated with the available text using a corresponding voice model from the one or more voice models stored in the voice model database, wherein the voice model serves as a virtual voice clone of a genuine voice used to generate the audio datasets; retrieving, by an ad stitcher module of the server, the generated audio clip from the TTS engine; and inserting, by the ad stitcher module, the retrieved audio clip into the requested media file to generate an integrated media file.

In some embodiments, the method includes providing, by the server, the integrated media file to the user on the user device using a communication network.

In some embodiments, the method includes providing the requested media file to the user on the user device if the text is not available in any one of the in-house ads inventory and the one or more third-party ads providers.

In some embodiments, the features of the one or more previously requested media files stored in the audio dataset to be extracted by the voice model generator module are prosodic and spectrographic audio features of the one or more previously requested media files, the extracted features configured to generate a voice dataset.

In some embodiments, the step of associating the voice model of the audio dataset comprises the step of generating, by the voice model generator module, one or more voice models of the audio dataset based on the extracted features of the one or more previously requested media files.

In some embodiments, the step of inserting the audio clip into the media file comprises step of inserting the audio clip at a predefined location into the media file.

In some embodiments, the step of inserting the audio clip into the media file comprises step of inserting the audio clip dynamically at a location chosen by the ad stitcher module.

In some embodiments, the step of generating the audio clip is repeated on every request of the media file.

In some embodiments, the generated audio clip is configured to be stored for repeated use on a new request of the media file.

In some embodiments, the step of generating the audio clip is performed based on one or more previous requests of the media file and the extracted plurality of information of the one or more previous request.

In some embodiments, the one or more voice models are generated using Generative Adversarial Networks (GAN) and Fréchet Audio Distance.

In some embodiments, the voice dataset is configured to be used as a training set for the GAN.

Another aspect of the invention features, in some embodiments, a non-transitory computer-readable medium that comprises computer-executable instructions that, based on execution by at least one processor of a server, cause the server to perform steps of the any of the above methods.

The present disclosure further discloses a system for adding an audio clip to a media file. The system comprises at least one processor and at least one computer readable memory coupled to the at least one processor, and the processor is configured to perform all or some steps of the method described above.

The present disclosure further discloses a non-transitory computer readable medium comprising a computer-readable code comprising instructions, which when executed by a processor, causes the processor to perform all or some steps of the method described above.

BRIEF DESCRIPTION OF FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

LIST OF REFERENCE NUMERALS

10—system
112—transceiver
114—internal bus
100—server(s) or virtual machine(s)
102—request profiling module
104—ads middleware module
106—voice model generator module
108—text-to-speech (TTS) engine
110—ad stitcher module
120—user device
130—communication network
140—voice dataset
150—voice model database
160—in-house ads inventory
170—third-party provider

DETAILED DESCRIPTION

Embodiments of the present invention are best understood by reference to the figures and description set forth herein. All the aspects of the embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit and scope thereof, and the embodiments herein include all such modifications.

As used herein, the term 'exemplary' or 'illustrative' means 'serving as an example, instance, or illustration.' Any implementation described herein as exemplary or illustrative is not necessarily to be construed as advantageous and/or preferred over other embodiments. Unless the context requires otherwise, throughout the description and the claims, the word 'comprise' and variations thereof, such as 'comprises' and 'comprising' are to be construed in an open, inclusive sense, i.e., as 'including, but not limited to.'

This disclosure is generally drawn, inter alia, to methods, apparatuses, systems, devices, non-transitory mediums, and computer program products implemented as automated tools for inserting an audio clip into a media file requested by a user. Significantly, such audio clips are generated with cloned or mimicked voice models based on the original audio clips, e.g., to create a virtual voice clone capable of rendering recognizable audio clips based on text input.

The description strives to revolutionize the concept of automatically and dynamically inserting an audio clip into a requested media file by a user, e.g., to generate audio ads with voice output cloned or mimicked from an original host, actor, or other personality. The media file may be any form of audio and/or audio-visual media that is generally requested by users, such as, podcasts, streams, broadcast, radio stream, songs, and the like.

The term 'audio clip' as used in the present description and claims is intended to cover any form of audio clips that can be inserted into a media file, such as, but not limited to, personalized speech, customized speech, advertisements, notices, announcements, introductions, and the like.

In an exemplary embodiment, the audio clip represents an advertisement to be inserted into the media file.

Figure 1A:
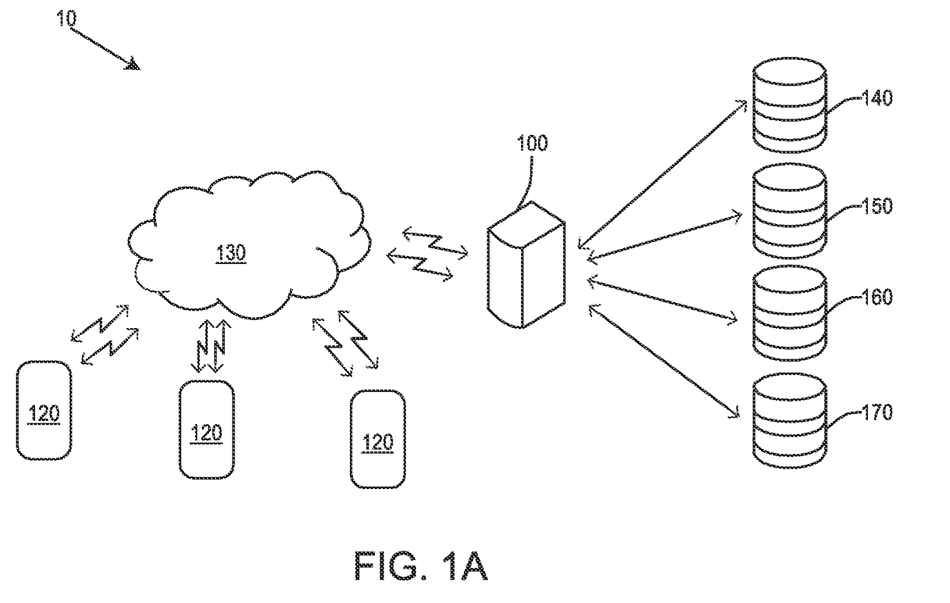
FIG. 1A illustrates a general overview of a system for adding an audio clip into a media file in accordance with the present disclosure.

FIG. 1A illustrates a general overview of a system 10 for adding an audio clip into a media file in accordance with the present disclosure. The system 10 comprises one or more user devices 120 and a server 100 in communication with the one or more user devices 120 via a communication network 130. The server 100 and the one or more user device 120 are communicatively coupled to each other so as to transfer information and data therebetween.

The one or more user devices 120 are configured to support reproduction of digital audio. Further, the user device 120 comprises a user interface (not shown) for facilitating a user to request the media file. Some non-limiting examples of the one or more user devices 120 include laptop and desktop computers, smartphones and tablets, smartwatches, smart speakers, and dedicated devices for listening to an audio.

Figure 1B:
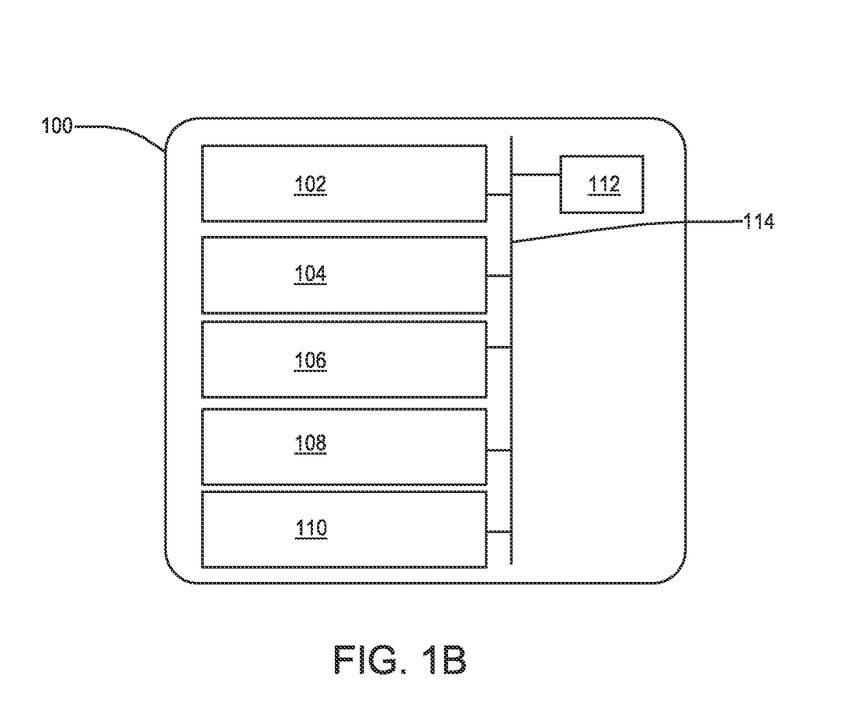
FIG. 1B illustrates exemplary internal structure of a server in accordance with the present disclosure.
Figure 1C:
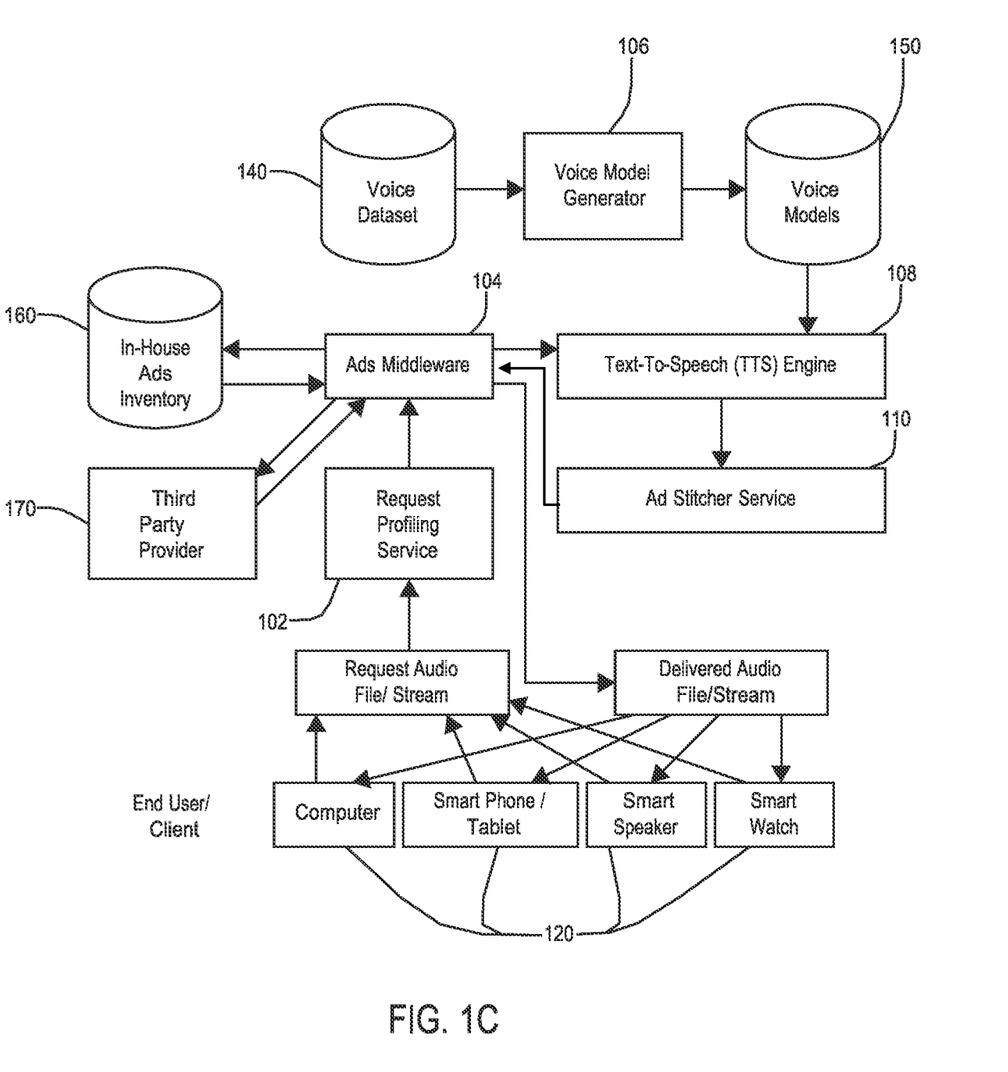
FIG. 1C illustrates an exemplary elaborated block diagram of a system in accordance with the present disclosure.

The server 100 mentioned in the present disclosure refers to a server which is configured to provide various functionalities of the present disclosure and is configured for inserting an audio clip into a media file. An illustrative internal structure of the server 100 is shown in FIG. 1B. The term "server" can include any number of servers, clusters of servers, and pods within real or virtual machines, e.g., dockerized containers within one or more k8s pods within one or more virtual machines/instances within one or more real machines. The server 100 includes a transceiver 112, a request profiling module 102, an ads middleware module 104, a voice model generator module 106, a text-to-speech (TTS) engine 108, and an ad stitcher module 110. It is to be noted that the components of the server are internally in communication using an internal bus 114, as would be apparent to a skilled person in the art in view of the present disclosure. FIG. 1C illustrates an exemplary elaborated block diagram of the system 10 in accordance with the present disclosure.

In some embodiments, cloud instances, virtual instances, dockerized instances and orchestration services like K8s, do not require an "internal bus" as with physical machines.

In some embodiments, the server can also contain and run the databases (engine and storage of a DB runs in a server). i.e. the "server" can also include Voice dataset 140, Voice Models 150 and In-house ad inventory 160.

According to an exemplary embodiment, the system comprises at least one processor and a computer readable medium, and the system is implemented as computer readable and executable instructions stored on a computer readable medium for execution by a general or special purpose processor.

Although illustrated as discrete components, various components may be divided into additional components, combined into fewer components, or eliminated while being contemplated within the scope of the disclosed subject matter. It will be understood by those skilled in the art that each function and/or operation of the components may be implemented, individually and/or collectively, by a wide range of hardware, software, firmware, or virtually any combination thereof. The system components may be provided by one or more server computers and associated components. According to an embodiment, the server is configured to provide various functionalities of the present disclosure with execution of a set of instructions, stored in a database, by one or more processing units. Further, the server communicates with the one or more user devices by the transceiver using the communication network 130. The network 130 can be different wired and wireless communication networks, such as Internet, Intranet, PSTN, Local Area Network (LAN), Wide Area Network (WAN), Metropolitan Area Network (MAN), and so forth. The information storage, retrieval, update, and such activities in such the database may be handled by the one or more processing units.

In an exemplary embodiment of the present disclosure, the functionalities of the server are implemented on a cloud network.

In an exemplary embodiment of the present disclosure, the user devices are configured to execute an application. The application may be implemented as a software application or combination of software and hardware. Further, the application installed in the user devices is suitably configured to connect the user devices with services offered by the server, and thus, the application allows the respective users of the user devices to access the system to insert an audio clip to a media file. In another exemplary embodiment, the user devices are configured to access functionalities of the server 100 of the present disclosure using any one of a plurality of available browsers or client apps, e.g. a podcast player app.

Referring back to FIGS. 1A-1B, the server 100 is configured to receive a request of a media file from a user using a user device 120. The request profiling module 102 is configured to receive the request and generate a profile of the user based on the request. In generating a profile, the request profiling module 102 is configured to extract information from the received request. Some non-limiting examples of the extracted information include IP address, user agent, time, method, resource of the request, and the like. The profile of the user may comprise a geolocation of the user calculated from IP address, local time based on the geolocation, type of the user device based on the user agent, as well as other demographics, socioeconomic and environmental characteristics by means of statistical inference such as age and gender of the user, language, income, and local weather.

The ads middleware module 104 is configured to retrieve the profile from the request profiling module 102. The ads middleware module 104 is configured to establish a connection with an in-house ads inventory 160 and one or more third-party ads providers 170 (illustrated in FIG. 1A). In an embodiment, the in-house ads inventory 160 may be integral part of the server 100. In such embodiment, the ads middleware module 104 communicates with the in-house ads inventory 160 using the internal bus 114. In other embodiment, the in-house ads inventory 160 may be externally coupled with the ads middleware module 104 using the communication network 130. The ads middleware module 104 is configured to determine a text from either the in-house ads inventory 160 or the one or more third-party ads providers 170 for generating an audio clip based on the profile of the user. The in-house inventory 160 is configured to store one or more text-data corresponding to one or more audios. The one or more audios may be corresponding to advertisements, speeches, and the like. In an exemplary embodiment, the one or more audios correspond to advertisements suitable for the user based on the profile of the user generated by the request profiling module 102.

The voice model generator module 106 is configured to generate one or more voice models. The voice model generator module 106 is configured to be in communication with an audio database (not shown) including an audio dataset. The audio dataset is generated by extracting feature(s) of one or more previously requested media files by the user and storing the previously requested media files. Some examples of the features of the previously requested media files include, but not limited to, prosodic features such as pitch, timber, stress, accent, rhythm and intonation, and spectrographic audio features such as Amplitude Envelope, Spectral Centroid and Bandwidth, Band Energy Ratio, Mel-Frequency Cepstral Coefficients (MFCCs), Zero-Crossing Rate (ZCR), Root Mean Square (RMS) Energy. The extracted prosodic and the spectrographic features are used to generate a feature set. The feature set is stored as an object associated with the requested media file into a voice dataset 140.

The voice model generator module 106 is configured to generate one or more voice models with respect to the feature set stored in the voice dataset 140. In an embodiment, the voice model generator module 106 uses machine learning and deep learning techniques to generate the one or more voice models. Some non-limiting examples include use of Generative Adversarial Networks (GAN) and Fréchet Audio Distance to create the voice model. In such examples, the voice dataset is used as a training set to train the GAN model. A backpropagation process in the GAN model reinforces weights in a generator of the GAN model to increase accuracy until a discriminator of the GAN model is not capable of distinguishing the generated output from the voice dataset. In other examples, the voice model generator module 106 uses different machine learning techniques and neural networks to generate one or more voice models. The generated one or more voice models are configured to be stored in a voice model database 150.

The text-to-speech (TTS) engine 108 is configured to retrieve the text from the ads middleware module 104 and a corresponding voice model from the voice model database 150. The TTS engine 108 is configured to generate the audio clip which is to be inserted into the requested media file.

The ad stitcher module 110 is configured to retrieve the generated audio clip from the TTS engine 108 and insert the generated audio clip to the requested media file, thereby generating an integrated media file. In one embodiment, the generated audio clip can be inserted at a predefined location in the requested media file, e.g., pre-roll, mid-roll, post-roll. In another embodiment, the audio clip can be inserted dynamically at a location chosen by the ad stitcher module using windows of silence, pauses or context, for instance, in cases when a transcription of the requested medial file is available.

The server has been described above with reference to various modules. The modules described above can be implemented as hardware, software, firmware, or a combination thereof. In an implementation, the modules described above can be implemented as a processor (not shown) The processor may represent a unit, or a plurality of interconnected units, that is configured to implement the functionalities of the modules of the server as well as to coordinate among the various modules. The processor may be programmed using software (e.g., microcode) to perform various functionalities of the modules of the server. It is appreciated that the processor may include a central processing unit (CPU), a graphics processing unit (GPU), a microcontroller, a processing core, a field-programmable gate array (FPGA), AI processor, or similar devices capable of executing instructions.

The system includes a non-transitory computer readable storage medium which comprises instructions executable by a processor, such as the processor implementing the functionalities of the modules of the server. The computer readable medium may comprise any electric, magnetic, optical, or other physical storage device that stores executable instructions. The instructions may comprise instructions to cause the processor to perform or control operations of the modules of the server described above with reference to FIG. 1A. The instructions may comprise instructions to cause the processor to perform various methods described herein.

The methods described further below in the disclosure may be performed using the system described herein, that is, the steps of the methods may be performed by the processor implementing the modules or by the respective modules. It is contemplated that the instructions to perform the steps of the methods described further below may be stored in the computer readable storage medium, in that, execution of the instructions stored in the computer readable storage medium by the processor cause the processor to perform the functionalities of the modules of the server described above.

The term "computer-readable media" as used herein refers to any medium that provides or participates in providing instructions to the processor of the computer (or any other processor of a device described herein) for execution. Such a medium may take many forms, including but not limited to, non-volatile media and volatile media. Non-volatile media include, for example, optical, magnetic, or opto-magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other medium from which a computer can read. Such media may include components of cloud storage, e.g. relying on AWS S3.

Figure 2:
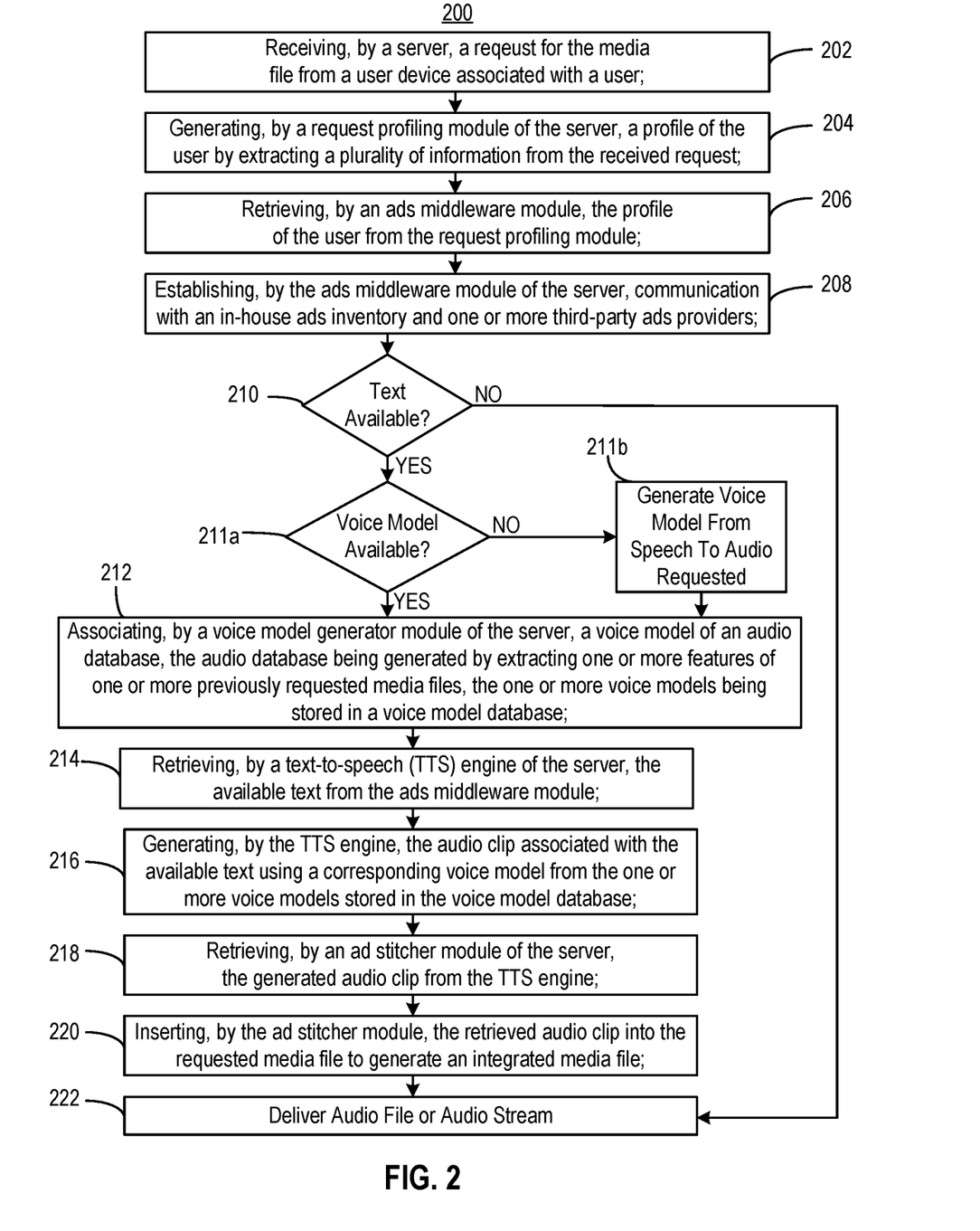
FIG. 2 illustrates an exemplary flowchart for an end-to-end process flow from request to delivery of a media file in accordance with the present disclosure.

FIG. 2 illustrates an exemplary flowchart of an end-to-end method 200 performed from request to delivery of a media file in accordance with the present disclosure that clones the voice (also known as "deepfake") or mimics prosodic speech features from a requested media file. The term 'clone' is defined as to create an exact copy or replica. In the present disclosure, the term 'clone' is regarded with respect to voice of a person. The term 'mimic' is defined as to imitate. The term 'mimic' is regarded with respect to imitating voice of the person in accordance with the present disclosure. The newly created audio clips are inserted into or streamed within the requested media file. It is to be noted that fetching of the requested media file stored in a corresponding cloud service providing network or any other network would be apparent to a skilled person in view of the present disclosure. It is to be noted that the method is implemented by means of the system as described with reference to FIGS. 1A-1C. Accordingly, the components of the system 10 are included hereinbelow for performing the method 200.

In step 202, the server 100 receives a request of a media file from a user by means of a user device 120. The user may request a media file via different distribution methods. One non-limiting example of a distribution method is Really Simple Syndication (RSS) feeds or streaming. In an exemplary embodiment, the requested media file is an audio file such as an audio snippet or human voice samples and speech in natural contexts such as a podcast, or radio episodes. In another exemplary embodiment, the requested media file is a video and/or audio-visual file. In some exemplary embodiments, the user may request the media file on demand.

In step 204, the request profiling module 102 extracts a plurality of information about the user based on the received request and generates a profile of the user based on the extracted information. Some examples of the extracted information include, but not limited to, IP address, user agent, time, method, and resource of the request. The profile of the user may consist of a geolocation of the user calculated from the IP address, local time based on the geolocation, type of device based on the user agent, as well as other demographics, socioeconomic and environmental characteristics by means of statistical inference such as age and gender of the user, language, income, and local weather.

In step 206, the ads middleware module 104 retrieves the user profile generated by the request profiling module 102. In step 208, the ads middleware module 104 establishes communication with an in-house ads inventory 160 and one or more third-party providers 170 using the communication network 130.

In step 210, the ads middleware module 104 determines whether one or more audio scripts, e.g., advertisements in textual format, are available in either the in-house ads inventory 160 or the one or more third-party providers 170 for insertion. The audio scripts stored in the in-house ads inventory 160 and the one or more third-party providers 170 may be in text form. If a corresponding text of an audio script is available in either the in-house ads inventory 160 or the one or more third-party provider 170, the corresponding text of the audio script is retrieved by the ads middleware module 104.

Figure 3:
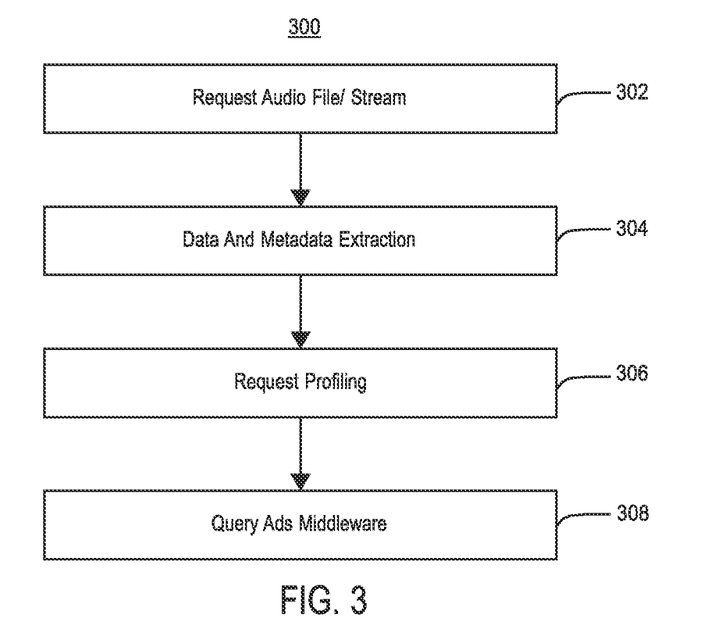
FIG. 3 illustrates an exemplary block diagram illustrating steps performed by a request profiling module and an ads middleware module in accordance with the present disclosure.

FIG. 3 illustrates an exemplary method 300 illustrating steps performed by the server, in particular by the request profiling module 102 and the ads middleware module 104, for extracting user information to generate user profile and identifying potential text to be inserted into the requested media file as an audio clip in accordance with the present disclosure. In step 302, a request for a media file is received by the server. In step 304, the request profiling module extracts the information from the received request. In step 306, a profile of the user is generated based on the extracted information. In step 308, the ads middleware module 104 determines availability of a text in the in-house inventory 160 and the one or more third-party providers 170.

In an embodiment where the audio script is an advertisement, the in-house ads inventory 160 may be generated and maintained via a marketplace where advertisers provide textual advertisements and specify desired targets in terms of end users segments. The third-party provider 170 may be composed of one or more advertising agencies or a meta-service interacting with multiple advertising agencies (e.g. via APIs).

If no text is available in the in-house ads inventory 160 or the one or more third-party providers 170, either due to lack of inventory or incompatibility with the request profiling module 102, the requested media file is delivered to the user with no inserted audio clip, that is, with no change from the originally requested media file.

Referring to FIG. 2, if a corresponding text is available in either or both of the in-house ads inventory 160 or the one or more third-party providers 170, the voice model generator module 106 determines if a voice model is available or not in step 211a. Such text can be retrieved from both in-house and third-party inventories and then the ads middleware may choose the best and most optimal text, e.g. in terms of CPM, to be sent to the TTS engine. In step 212, the voice model generator module 106 associates a voice model stored in a voice model database 150 which has been associated with the previously requested media file. The voice model is generated by the voice model generator module 106 for an audio dataset, e.g., Voice Dataset. The audio dataset is generated by extracting feature(s) of one or more previously requested media files. The features of the one or more previously requested media files include, but not limited to, prosodic and spectrographic audio features of the one or more previously requested media files.

Figure 5:
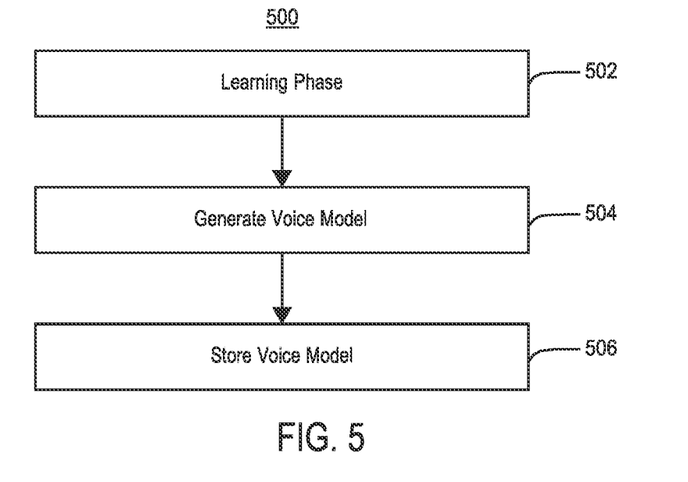
FIG. 5 illustrates an exemplary block diagram of steps required in generation of a voice model.

If a corresponding voice model is not available, then the voice model generator module 106 generates, in step 211b, one or more voice models of the audio dataset based on the extracted features of the one or more previously requested media files, as illustrated in FIG. 5. The extracted prosodic and the spectrographic features generate a feature set. The feature set is stored as an object associated with the requested media file into a voice dataset 140.

Referring to FIG. 5, a method 500 for generation of a voice model is illustrated. the voice dataset 140 is configured to be used as a training set for learning phase in step 502, that may consist of supervised and unsupervised machine learning and deep learning techniques. Based on the training, a voice model is generated in step 504. The generated voice model is then stored in the voice model database 150 in step 506. It is to be noted that the method of generating the voice model is performed by the voice model generator module 106.

Figure 6:
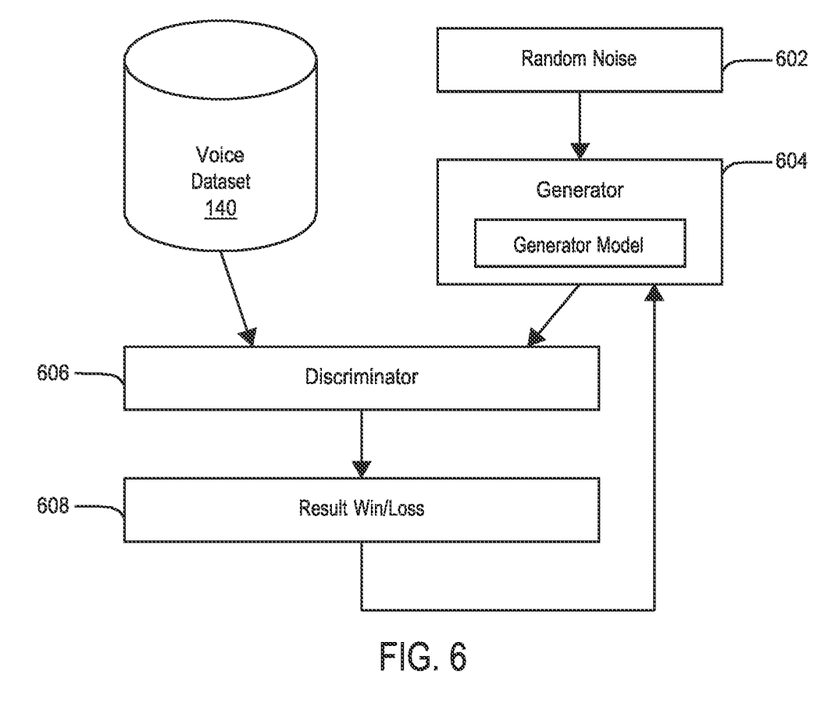
FIG. 6 illustrates an exemplary process of a voice model generation using Generative Adversarial Networks (GAN)

One example of learning phase and voice model generation is the use of Generative Adversarial Networks (GAN), as illustrated in FIG. 6. In step 602, a random noise is generated which is to be fed to a generator of the GAN model. In step 604, the generator trains a generator model on the received random noise. The generated output by the generator is provided to a discriminator of the GAN model, in step 606, along with a voice model from the voice model dataset 140. The discriminator is trained on the inputs for distinguishing random noise from the voice model. To check for optimality of results, the discriminatory network may adopt unsupervised audio and quality measurements such as the Fréchet Audio Distance (FAD). In step 608, a back-propagation process is performed which reinforces weights in the generator to increase accuracy until the discriminator is not capable of distinguishing the generated output from the voice dataset 140.

Referring back to FIG. 2, in step 214, the text-to-speech (TTS) engine 108 retrieves the available text from the ads middleware module 104. Further, the TTS engine 108 retrieves the corresponding voice model from the voice model database 150. In step 216, the TTS engine 108 generates the audio clip to be inserted into the requested media file from the available text from the ads middleware module 104 based on the voice model from the voice model database 150. In case, if the voice model for requested audio does not exist, prior to calling text-to-speech engine, the method proceeds to generate ex novo a model, as illustrated in FIG. 4.

Figure 4:
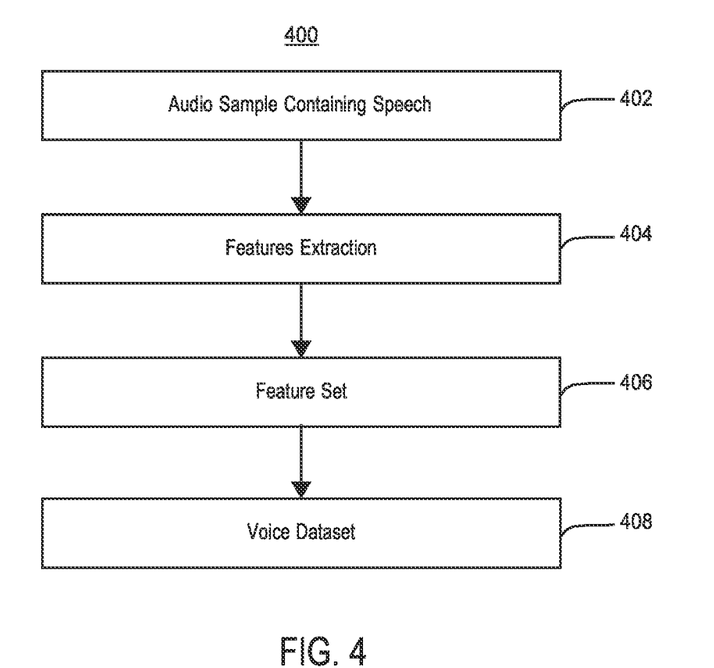
FIG. 4 illustrates an exemplary block diagram of a process of feature extraction from a media file until the creation of the feature set and storage of in a dataset.

Referring to FIG. 4, a method 400 of feature extraction from a media file until the creation of the feature set and storage of in a dataset is illustrated. The requested media file, such as an audio sample, is analyzed to identify the presence of speech in step 402. If speech from one or more voices is found, feature extraction on the requested media file is performed in step 404. The feature extraction consists in the extraction of features from the requested media file that may include spectrographic characteristics such as Amplitude Envelope, Spectral Centroid and Bandwidth, Band Energy Ratio, Mel-Frequency Cepstral Coefficients (MFCCs), Zero-Crossing Rate (ZCR), Root Mean Square (RMS) Energy and prosodic characteristics such as pitch, timber, stress, accent, rhythm, and intonation. The spectrographic and prosodic characteristics thereby form the feature set in step 406. In step 408, the feature set is stored as an object associated with audio into the voice dataset 140.

In an embodiment, the text may also include placeholders for variable content within the same audio clip that may change according to the user profile resulting from request profiling module 102 (e.g., target specific demographic and socioeconomic traits).

Referring back to FIG. 2, in step 218, the ad stitcher module 110 retrieves the audio clip generated by the TTS engine 108. The ad stitcher module 110, in step 220, inserts the retrieved audio clip to the requested media file to generate an integrated media file. In an exemplary embodiment, the audio clip is inserted at a predetermined location in the requested media file, e.g., pre-roll, mid-roll, post-roll. In other exemplary embodiments, the audio clip can be inserted dynamically at a location chosen by the ad stitcher module using windows of silence, pauses or context in case when a transcription of the requested medial file is available.

In step 222, the integrated media file is sent to the user device 120, and thus to the user, by the transceiver 112 of the server 100 via the communication network 130.

Figure 7:
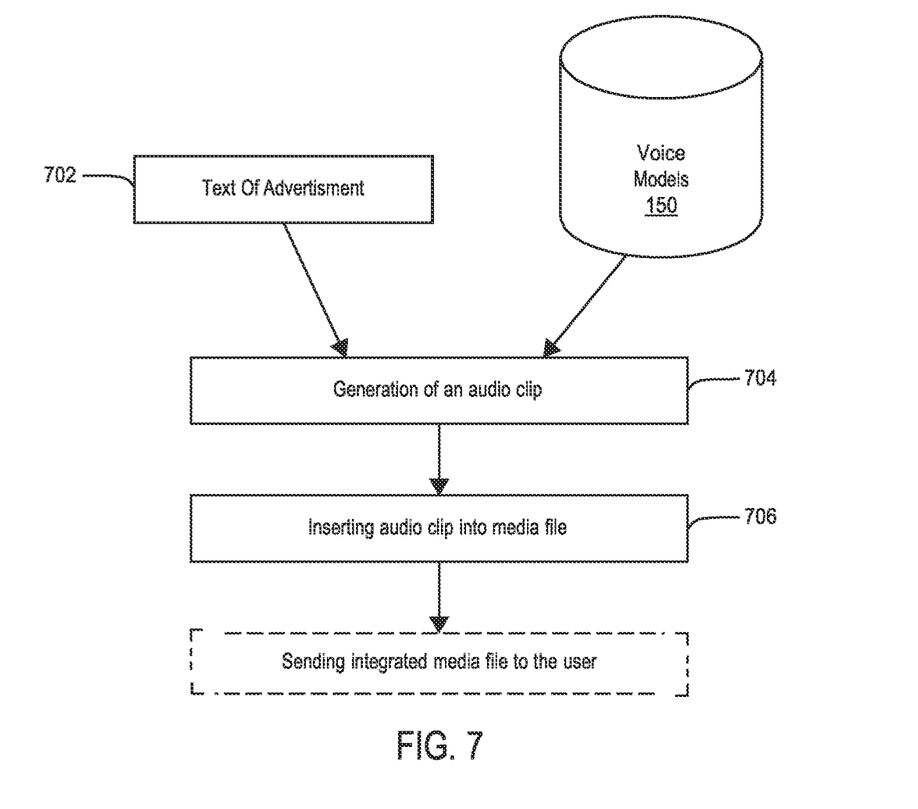
FIG. 7 illustrates an exemplary process of an audio clip generation and stitching via a text-to-speech (TTS) engine and an ad stitcher module, respectively, in accordance with the present disclosure.

A simplified step performed by the TTS engine 108 and the ad stitcher module 110 are shown in FIG. 7. Accordingly, in step 702, the text 302 from the ads middleware module is retrieved by the TTS engine 108. The TTS engine further retrieves a voice model from the voice model database. In step 704, the TTS engine 108 generates an audio clip based on the retrieved text and the retrieved voice model. In step 706, the ad stitcher module 110 inserts the audio clip into the requested media file to generate an integrated media file. The integrated media file is then sent to user on the user device 120 using the communication network 130.

Because the stitching, i.e., insertion of audio clips, occurs on the fly once a media file such as a podcast episode is requested by the user, the audio clip generation process can be repeated upon each new request (e.g. to leverage place-holders in the text and target specific end-user segments) in an embodiment. In another embodiment, the generated clip can be stored in an internal memory for a certain amount of time according to predefined rules (e.g., cached by device type and geolocation) to reduce the computational power required for the generation of the audio clip and the composition of the integrated media file.

In yet another embodiment, the audio clip is generated based on one or more previous requests by the same user and the extracted information of the one or more previous requests.

In further embodiment of the current disclosure, the creation of novel audio clip congruent to surrounding voice or sound via TTS engine 108 can be made prior to the request and distributed based on other parameters of the request, method of request, or medium.

One of the applications of the system and method of the present disclosure is a novel approach of inserting audio clips, such as advertisements, into one or more media content requested by a user, thus allowing leveraging the advantages of both native and programmatic advertising in audio content such as podcasts and broadcasts or video content. The audio clips are generated with a voice model that clones or mimics the genuine voice contained in the original audio dataset.

By cloning or mimicking the host's voice in the requested media file, it is possible to implement host-read advertisement that is inserted into audio content in a programmatic fashion.

Audio clips, such as advertisements, that are inserted into the requested media using the cloned voice of the host effectively become host-read ads, which increases trustworthiness in the listeners, thus maximizing advertisement impact.

Similarly, advertisements using a voice that mimics or resembles the host, such as accent and intonation, may convey a higher affinity with the advertisement and thus increase trust, as well as efficacy and engagement with the product or service advertised.

It is to be noted herein that various aspects and objects of the present disclosure described above as methods and processes should be understood to an ordinary skilled in the art as being implemented using a virtual shell or a physical system that includes a computer that has a CPU, display, memory, and input devices such as a keyboard and mouse. According to an embodiment, the system is implemented as computer readable and executable instructions stored on a computer readable media for execution by a general or special purpose processor. The system may also include associated hardware and/or software components to carry out the method functions in accordance with the present disclosure. The system is preferably connected to an internet connection to receive and transmit data.

Although the present invention has been described in terms of certain preferred embodiments, various features of separate embodiments can be combined to form additional embodiments not expressly described. Moreover, other embodiments apparent to those of ordinary skill in the art after reading this disclosure are also within the scope of this invention. Furthermore, not all of the features, aspects and advantages are necessarily required to practice the present invention. Thus, while the above detailed description has shown, described, and pointed out novel features of the invention as applied to various embodiments, it will be understood that various omissions, substitutions, and changes in the form and details of the apparatus or process illustrated may be made by those of ordinary skill in the technology without departing from the spirit of the invention. The inventions may be embodied in other specific forms not explicitly described herein. The embodiments described above are to be considered in all respects as illustrative only and not restrictive in any manner. Thus, scope of the invention is indicated by the following claims rather than by the above description.

What is claimed is:

1. A system for adding a cloned audio clip to a media file, the system comprising:
   one or more user devices associated with respective users, the one or more user devices being configured to request the media file using a user interface, and
   a server in communication with the one or more user devices, the server comprising:
      a request profiling module configured to receive a request of the media file from the user device and generate a profile of the associated user by extracting a plurality of information from the received request;
      a middleware module communicatively coupled with the request profiling module, an in-house content inventory, and one or more third-party content providers, the middleware module configured to retrieve the extracted information of the user and determine a text from any one of the in-house content inventory, and the one or more third-party content providers for generating the audio clip based on the extracted information, the in-house content inventory being configured to store one or more text-data;
      a voice model generator module communicatively coupled to an audio dataset, the voice model generator module configured to analyze the audio dataset to generate one or more voice models to clone and mimic one or more voices included in the audio dataset, the audio dataset being generated by extracting features of one or more previously requested media files, the one or more voice models being stored in a voice model database, wherein the voice model generator module uses a Generative Adversarial Network (GAN) comprising a discriminator adopting a Fréchet Audio Distance, wherein the GAN further comprises a generator, wherein the generator trains a generator model on random noise, wherein a generated output by the generator is provided to the discriminator, wherein the discriminator is trained for distinguishing the random noise from the one or more voice models;
      a text-to-speech (TTS) engine configured to be in communication with the voice model database and the middleware module, the TTS engine configured to retrieve the text from the middleware module and convert the text into an audio clip using one or more voice models stored in the voice model database; and
      a generated audio clip stitcher module coupled with the TTS engine, the generated audio clip stitcher module configured to insert the generated audio clip into the requested media file to generate an integrated media file.

2. The system of claim 1, wherein the text comprises one or more placeholders to change a part of the text as per the generated profile of the user.

3. The system of claim 1, wherein the generated profile of the user comprises one or more of an IP address, a time, a method, a resource, a geolocation, a local time based on the geolocation, a type of the user device, demographics, socio-economic and environmental characteristics, a language, and a local weather.

4. The system of claim 1, wherein the voice model generator module is configured to extract prosodic and spectrographic audio features of the one or more previously requested media files stored in the audio dataset.

5. A method for adding an audio clip to a media file, the method comprising:
   receiving, by a server, a request for the media file from a user device associated with a user;
   generating, by a request profiling module of the server, a profile of the user by extracting a plurality of information from the received request;
   retrieving, by a middleware module, the profile of the user from the request profiling module;
   establishing, by the middleware module of the server, communication with an in-house content inventory and one or more third-party content providers;
   determining, by the middleware module, availability of a corresponding text from any one of the in-house content inventory and the one or more third-party content providers based on the retrieved information;
   associating, by a voice model generator module of the server, a voice model of an audio dataset, the audio dataset being generated by extracting one or more features of one or more previously requested media files, the one or more voice models being stored in a voice model database, wherein the one or more voice models are generated using a Generative Adversarial Network (GAN) comprising a generator and a discriminator, the discriminator adopting a Fréchet Audio Distance, wherein the generator trains a generator model on random noise, wherein a generated output by the generator is provided to the discriminator, wherein the discriminator is trained for distinguishing the random noise from the one or more voice models;
   retrieving, by a text-to-speech (TTS) engine of the server, the available text from the middleware module;
   generating, by the TTS engine, the audio clip associated with the available text using a corresponding voice model from the one or more voice models stored in the voice model database, wherein the voice model serves as a virtual voice clone of a genuine voice used to generate the audio datasets;
   retrieving, by a generated audio clip stitcher module of the server, the generated audio clip from the TTS engine; and
   inserting, by the generated audio clip stitcher module, the retrieved audio clip into the requested media file to generate an integrated media file.

6. The method of claim 5, comprising providing, by the server, the integrated media file to the user on the user device using a communication network.

7. The method of claim 5, comprising providing the requested media file to the user on the user device if the text is not available in any one of the in-house content inventory and the one or more third-party content providers.

8. The method of claim 5, wherein the features of the one or more previously requested media files stored in the audio dataset to be extracted by the voice model generator module are prosodic and spectrographic audio features of the one or more previously requested media files, the extracted features configured to generate a voice dataset.

9. The method of claim 5, wherein the step of associating the voice model of the audio dataset comprises a step of generating, by the voice model generator module, one or more voice models of the audio dataset based on the extracted features of the one or more previously requested media files.

10. The method of claim 5, wherein the step of inserting the audio clip into the media file comprises a step of inserting the audio clip at a predefined location into the media file.

11. The method of claim 5, wherein the step of inserting the audio clip into the media file comprises a step of inserting the audio clip dynamically at a location chosen by the generated audio clip stitcher module.

12. The method of claim 5, wherein the step of generating the audio clip is repeated on every request of the media file.

13. The method of claim 5, wherein the generated audio clip is configured to be stored for repeated use on a new request of the media file.

14. The method of claim 5, wherein the step of generating the audio clip is performed based on one or more previous requests of the media file and the extracted plurality of information of the one or more previous request.

15. The method of claim 5, wherein the voice dataset is configured to be used as a training set for the GAN.

16. A non-transitory computer-readable medium that comprises computer-executable instructions that, based on execution by at least one processor of a server, cause the server to perform steps of the method of claim 5.

17. The method of claim 5 wherein the voice model generator module is configured to perform a backpropagation process to reinforce weights to increase accuracy until the discriminator is not capable of distinguishing the generated output from the voice dataset.

18. The method of claim 17 wherein the voice model generator module is configured to receive the random noise.

19. The system of claim 1 wherein the voice model generator module is configured to perform a backpropagation process to reinforce weights to increase accuracy until the discriminator is not capable of distinguishing the generated output from the voice dataset.

20. The system of claim 19 wherein the voice model generator module is configured to receive the random noise.

* * * * *